(12) United States Patent
Ettemeyer

(10) Patent No.: US 6,439,524 B1
(45) Date of Patent: Aug. 27, 2002

(54) MEASURING HEAD HOLDER

(76) Inventor: Andreas Ettemeyer, Milloeckerweg 17, Neu-Ulm (DE), 89231

( * ) Notice: Subject to any disclaimer, the term of this patent is extended or adjusted under 35 U.S.C. 154(b) by 0 days.

(21) Appl. No.: 09/490,219

(22) Filed: Jan. 24, 2000

(30) Foreign Application Priority Data

Jan. 25, 1999 (DE) .......................................... 199 02 781

(51) Int. Cl.$^7$ .............................. A47F 5/00; G01C 9/00
(52) U.S. Cl. ...................... 248/309.1; 33/372; 33/373
(58) Field of Search .............................. 248/309.1, 610, 248/613; 33/372, 373, 555.1; 200/82 E (56) References Cited

U.S. PATENT DOCUMENTS

| | | | | |
|---|---|---|---|---|
| 1,341,935 A | * | 6/1920 | Schustarich | 33/572 |
| 4,071,725 A | * | 1/1978 | Smith et al. | 200/82 E |
| 4,176,461 A | * | 12/1979 | Gebel et al. | 33/555.1 |
| 4,594,487 A | * | 6/1986 | Grassl et al. | 200/82 E |
| 4,898,079 A | * | 2/1990 | Combette | 92/5 R |
| 4,928,392 A | * | 5/1990 | Donaldson | 33/555.1 |
| 5,036,595 A | * | 8/1991 | Nevery | 33/642 |
| 5,063,679 A | * | 11/1991 | Schwandt | 33/347 |
| 5,228,205 A | * | 7/1993 | Bertz et al. | 33/556 |
| 6,079,113 A | * | 6/2000 | Helmrichs | 33/555.1 |
| 6,330,753 B1 | * | 12/2001 | Li | 33/550 |

FOREIGN PATENT DOCUMENTS

| | | |
|---|---|---|
| DE | PS 10 30 042 | 5/1958 |
| DE | 27 26 867 | 1/1979 |
| DE | 2726867 | * 1/1979 |
| DE | 28 05 355 | 8/1979 |
| DE | 28 23 052 | 11/1979 |
| DE | 42 28 426 C1 | 3/1994 |
| EP | 0 309 304 A1 | 3/1989 |
| EP | 379918 A2 | * 8/1990 |
| FR | 2417083 A | * 10/1979 |

OTHER PUBLICATIONS

English Translation of DE 2726867.*

* cited by examiner

*Primary Examiner*—Anita King
*Assistant Examiner*—Naschica S. Morrison
(74) *Attorney, Agent, or Firm*—John H. Crozler

(57) ABSTRACT

A measuring head holder for securing a measuring head to an object to be measured, comprising a receiving portion for definedly securing a measuring head thereto, and at least one securing element for fixing said receiving portion to said object to be measured.

21 Claims, 7 Drawing Sheets

MEASURING HEAD HOLDER

FIELD OF THE INVENTION

The invention concerns a measuring head holder for a measuring head, for example but not exclusively an optical measuring head.

BACKGROUND OF THE INVENTION

A typical form of optical measuring head is for example a 3-D speckle interferometry measuring head by means of which deformation and/or the contour of a surface of an object can be measured by a non-destructive procedure. For that purpose, the measuring head has to be moved into a defined position relative to the surface of the object whose surface is to be measured, and has to be held in that properly defined position during the measurement procedure.

In that respect a problem which frequently arises is that a measuring head can measure and survey on the object a measurement area which may be some square centimeters in size, whereas the object whose surface is to be measured is substantially larger. In such situations, there is frequently a wish to measure the surface of the object at a plurality of measurement locations thereon, in particular when the object is in different conditions and states. It is then necessary to measure the various measurement locations on the object firstly in an initial condition or state of the object and then for example in a condition or state of the object in which it is subjected to a loading.

As such a measuring head is generally a highly expensive component, the procedure adopted usually involves employing one and the same measuring head in succession at each of the individual measurement locations on the object whose surface is to be measured, rather than using a plurality of different measuring heads. It will be appreciated that it is important to achieve in that respect reproducible results in the respective conditions or states of the object whose surface is to be measured.

SUMMARY OF THE INVENTION

An object of the present invention is to provide a measuring head holder affording a simple and inexpensive way of holding a measuring head in a uniform position relative to an object whose surface is to be measured during measurement procedures.

Another object of the present invention is to provide a measuring head holder which can be previously secured to an object whose surface is to be measured in a properly defined position in order thereby to prepare the object for the measuring procedure, so that the measuring head can then be fixed to the fitted measuring head holder in a defined position and released therefrom again after measurement.

Still a further object of the present invention is to provide a measuring head holder for carrying a measuring head for measuring a surface of an object, for example using a 3-D speckle interferometry technique, which is of a simple design configuration and structure while nonetheless ensuring mounting of a measuring head thereto in the appropriately defined position.

In accordance with the principles of the present invention the foregoing and other objects are attained by a measuring head holder for mounting a measuring head, for example for implementing a 3-D speckle interferometry procedure on an object to be measured, wherein the measuring head holder has a mounting or receiving portion for definedly securing thereto a measuring head, and at least one securing element for fixing the mounting or receiving portion to said object.

As will be seen in greater detail from the description hereinafter of preferred embodiments of the invention, the fact that the measuring head holder includes a mounting or receiving portion, which can be referred to hereinafter for the sake of brevity just as the receiving portion, means that the measuring head can be released from the measuring head holder at any time without the holder being removed from the object to which it is mounted.

The fact that the receiving portion includes at least one securing element also means that the receiving portion can be fixed to the object, independently of the fixing of the measuring head to the holder.

In a preferred feature of the invention the receiving portion can be in the form of a mounting or adaptor ring having a central through opening, the longitudinal direction of which coincides with the observation direction of the measuring head. That arrangement ensures very stable securing of the measuring head to the object as the ring shape of the receiving portion guarantees a high level of stability without observation of the object whose surface is to be measured by the measuring head being adversely affected.

The measuring head holder may include as securing elements feet or legs, referred to hereinafter for convenience as feet, which are secured on the one hand to the receiving portion, more especially when in the form of an adaptor ring, and which on the other hand bear with their respective free front ends against the surface of the object. That arrangement provides that it is possible on the one hand to suitably select the number of mounting or attachment points, in general three such points to provide a properly defined but not over-defined mounting or support configuration. On the other hand, the position of the feet can be suitably selected in accordance with the shape of the object insofar as the holder or adaptor ring can have a plurality of possible mounting positions for the feet thereon.

To provide for maximum stability in terms of positioning of the measuring head holder with respect to the object whose surface is to be measured by the measuring head, the mounting points of the feet could be spaced away from each other to the maximum extent achievable in regard to the structure of the holder, that is to say for example the feet can extend inclinedly outwardly from the adaptor ring. That however gives rise to the problem that on the one hand association of the measuring area to be observed by the measuring head, in regard to position on the surface of the object, is something that can only be achieved with difficulty, while on the other hand there is also the problem that, in the event of deformation of the surface of the object in the measuring area being measured by the measuring head, it is not clear how the surface of the object is displaced with respect to the measuring area. With those considerations in mind, the mounting points of the measuring head holder and more particularly the mounting points of the feet on the surface of the object, will desirably be so selected that at least one of the mounting points and preferably in particular all mounting points are close to or precisely just in the measuring area.

In addition, the contact points of the measuring head holder and in particular the contact points of the feet are such that either only one mounting point, that is to say a foot, always remains fixedly on its point on the object, whereas the other two out of three can move along the surface of the object or, instead of the other feet, there can be an independent holding means which is external with respect to the object to be measured, for example a robot arm.

An alternative in this respect provides that all contact points of the feet against the object are arranged fixedly on the object and for example upon extension or elongation of the surface of the object, the feet experience elastic deformation which is uniform in regard to all feet.

While in the former case the fixed mounting point serves as a fixed point between the measuring area and the surface of the object even when the surface of the object experiences deformation, in the second case the fixed point between the surface of the object and the measuring area is the geometrical center between the fixed mounting points, thus generally the geometrical center of the above-mentioned adaptor ring which can preferably form the receiving portion.

A further possible structural configuration provides that there are at least three feet or legs on the adaptor ring, which ensure that there is a spacing that is always the same between the adaptor ring and the surface of the object, that is to say the length of the legs remain the same, without one of the mounting points serving as a fixed point. This is also sufficient to resolve the problem which arises from a mathematical point of view, of a system of equations comprising three equations with three unknowns. It will be appreciated however that in this respect the displacement of the measuring area may not be so great, between the initial condition and the measurement condition, that there are no longer any overlaps of the measuring areas in the two conditions or states.

The adaptor ring is preferably secured to the object in particular independently of the measuring head, using any suitable means, more particularly for example by means of spring force, elastic biasing of levers, vacuum suction devices, and more especially by means of mechanisms using levers which are movable into a locking condition by passing over a dead center point, that is to say with an over-center locking action, or by means of magnetic force. For that purpose, in a particular embodiment clamping pins or bolts can be screwed in laterally outwardly projecting relationship into the above-mentioned adaptor ring. Magnetic holders which are to be held to the magnetic surface of the object to be measured can then be suitably secured to the clamping pins or bolts. The magnetic holders are preferably elastically variable in terms of their configuration between the holders which fit to the surface of the object and the clamping pins or bolts, for example by means of suitable springs incorporated therebetween. Alternatively, the clamping pins or bolts can be used to secure clamping belts, straps, cords or like elements which extend around or embrace the object, to hold the measuring head holder to the surface of the object.

The measuring head is secured to the measuring head holder, for example to the above-mentioned adaptor ring, in a defined fashion such that it can be released at any time, by way of suitable fitting elements on the one hand and fixing means such as for example screw means on the other hand. The fitting elements such as fitting bores or pins fitted into the fitting bores or for example balls and the like which engage into central bores are arranged in particular on an annular flat rear face of the adaptor ring. Fitting pins which are fixedly arranged at the appropriate side of the measuring head can fit into the fitting bores, or inserted into the fitting bores are fitting pins which also fit into corresponding counterpart bores in the measuring head.

In particular the fitting elements can be arranged in such a way that the measuring head can also be fitted to the adaptor ring only in a given specific position.

In that case fixing can be effected for example by way of screw means between the measuring head and the adaptor or mounting ring. For that purpose, arranged on the ring are through openings which extend in the longitudinal direction, more particularly being distributed over the periphery thereof at a plurality of spaced locations.

In operation of the assembly, when the surface of an object is irradiated with laser light and in particular when using a superimposed reference beam technique, the contour of the surface of the object may be relatively difficult to detect. Therefore, white light illumination or illumination with visible light can make it easier to associate the measurement result with the surface of the object. For that purpose the measuring head holder and for example the measuring head also may include a light source emitting visible light, for example a white light emitting diode directed on to the object whose surface is to be measured.

So that tensile loadings which occur at the cable which supplies the measuring head do not have an effect on the contact between the measuring head holder and the object to which it is mounted, the arrangement may include in particular a means for relieving tensile loading on the cable, in the form of an elastic resilient cable loop as a means for buffering variations in length of the cable. This can be implemented in the form of a rubber sleeve which is resilient in the longitudinal direction, in the form of a loop or curl in the cable by means of a resilient loop-forming assembly, or by simply forming the cable in a helical or spiral configuration.

Further objects, features and advantages of the invention will be apparent from the description hereinafter of preferred embodiments.

DESCRIPTION OF PREFERRED EMBODIMENTS

Figure 1:
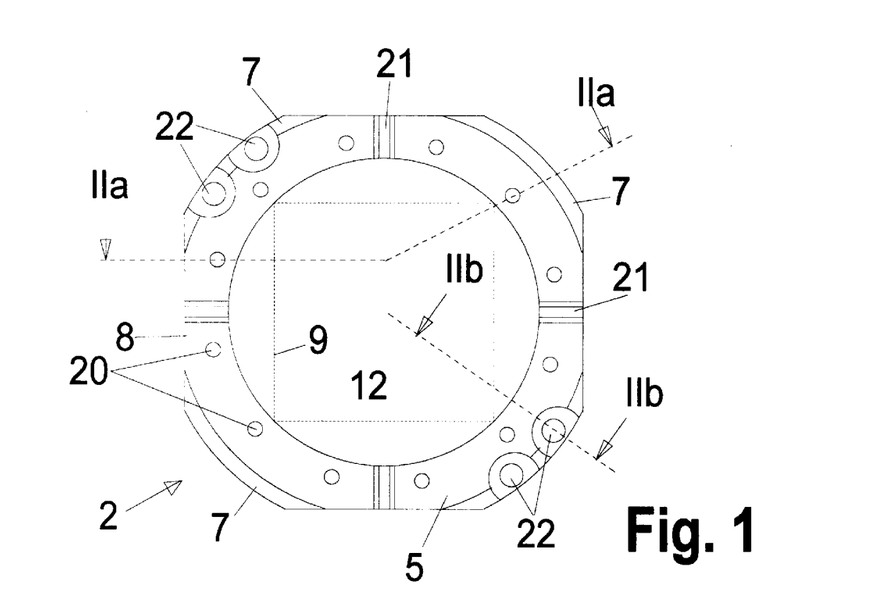
FIG. 1 shows a view on to an adaptor ring of the measuring head holder, from a front face thereof.
Figures 2A, 2B:
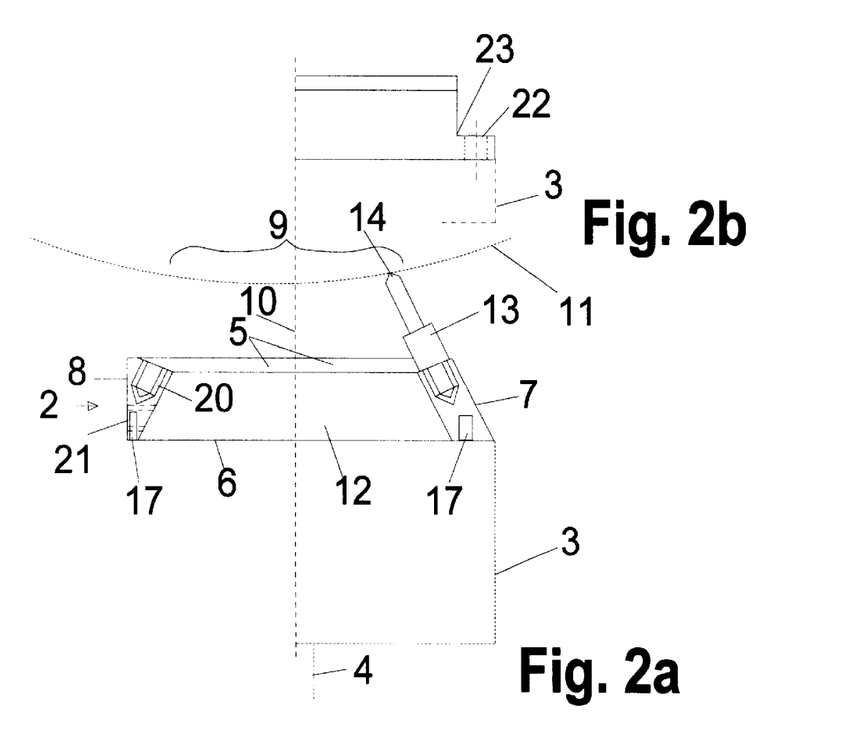
FIG. 2a and 2b show views in section of the FIG. 1 ring taken in the longitudinal direction thereof along, respectively, lines 11a and 11b thereof.

Reference will first be made to FIGS. 1 and 2 showing views in detail of a mounting or adaptor ring generally identified by reference numeral 2, forming a mounting or receiving portion of a measuring head holder according to the invention, for securing thereto in a defined position a measuring head which is indicated at 3 in FIG. 2b. The measuring head holder also has at least one securing element for fixing the receiving portion or adaptor ring 2 to an object 11 whose surface is to be measured, the at least one securing element being for example in the form of a leg or foot as indicated at 13 in FIG. 2a, referred to hereinafter as the foot.

Referring at this point more specifically to FIG. 2a, shown in the right-hand half thereof is the desired final condition for the measuring head holder in relation to the object 11 and more specifically the surface thereof, being the condition in which the adaptor ring 2 is fixed in relation to the object 11. The adaptor ring 2 has a plurality of feet 13 which extend away from the front face 5 of the adaptor ring 2 and bear in fixed relationship and at a defined position against the object 11 whose surface is to be measured. The measuring head indicated at 3 in FIG. 2a is fitted to the rear face 6 of the adaptor ring 2 and is fixed in a defined position thereon. A cable 4 for connecting the measuring head 3 to an electronic evaluation system (not shown) extends away from the measuring head 3.

It will be seen from the sectional view in FIG. 2a, taken in the longitudinal direction 10, that is to say in the direction in which a central through opening 12 extends through the adaptor ring 2, that the rear face 6 of the adaptor ring 2 is a flat annular face while the front face 5 is an annular face which is inclined inwardly in a conical configuration. Provided in that front face 5 in perpendicular relationship thereto and distributed uniformly over the periphery of the adaptor ring are screwthreaded bores 20 which serve for selectively screwing in feet 13 whose front free ends bear against the surface of the object 11.

It will be appreciated that it is also possible to envisage the arrangement having a flat front face 5 with inwardly cranked feet 13.

By virtue of the inclined positioning of the annular front face 5 of the adaptor ring 2, the feet 13 which are screwed into the screwthreaded bores 20 also face slightly inwardly towards the center of the adaptor ring 2 so that their points or tips 14 are still within the projection on to the free passage or through opening 12 of the adaptor ring 2. As shown in the right-hand half of FIG. 2a, at least one of the feet 13 has at its free front end a point, preferably a hardened point, so that it can sit firmly and without slipping on the surface of the object 11.

In general, three feet 13 are screwed into the adaptor ring 2, either being distributed uniformly over the periphery thereof or being arranged in accordance with the respective shape of the object 11 concerned, in order to provide for defined contact and support on the object 11.

In a manner corresponding to the inclination of the front, conically extending face 5 of the adaptor ring 2, that is to say perpendicularly thereto, both the inside peripheral surface of the adaptor ring 2 is inclined in a frustoconical configuration, and likewise also the outer peripheral surface, at least over a part of the periphery of the ring. The frustoconical external contour is interrupted at each of the four quadrants which are separated through 90° relative to each other, by a respective perpendicular flank surface as indicated at 8 in FIGS. 1 and 2a, which is perpendicular to the rear face 6 of the ring 2. The surfaces 8 can be produced for example by chamfering or milling.

The perpendicular flank 8 serves for the provision of transverse screwthreaded bores 21 in each of the four quadrants, the bores 21 being perpendicular to the flank 8 and thus parallel to the rear face 6 of the adaptor ring 2. The bores 21 pass through the adaptor ring 2 and suitable securing means can be screwed into the bores 21, preferably from the outside. In the region of inclined flanks as indicated at 7 in FIG. 1, the inclination of which can be more clearly seen at 7 in FIG. 2a, and at least on two mutually opposite flanks 7 and preferably at all four inclined flanks 7, the formation of a shoulder indicated at 23 in FIG. 2b on the outside periphery, whose limbs extend perpendicularly and parallel respectively to the rear flat face 6 of the adaptor ring 2, provides plate portions or lugs through which securing openings 22 extend parallel to the longitudinal direction 10 of the adaptor ring 2.

These securing openings 22 serve as securing lugs for passing screw means therethrough, thereby to screw the measuring head 3 to the adaptor ring 2.

Provided in the rear flat face 6 in the longitudinal direction 10 and distributed over the periphery of the arrangement are a plurality of fitting bores which are indicated at 17 in FIG. 2a and which are in the form of blind bores which serve for the insertion of fitting pins (not shown). The pins in turn project into the measuring head, for defined positioning of the measuring head with respect to the adaptor ring 2.

FIG. 1 also indicates in the through opening 12 a rectangular measuring area 9 which is the area that can be surveyed and measured by the measuring head 3 when fitted on to the adaptor ring 2.

Figure 3A:
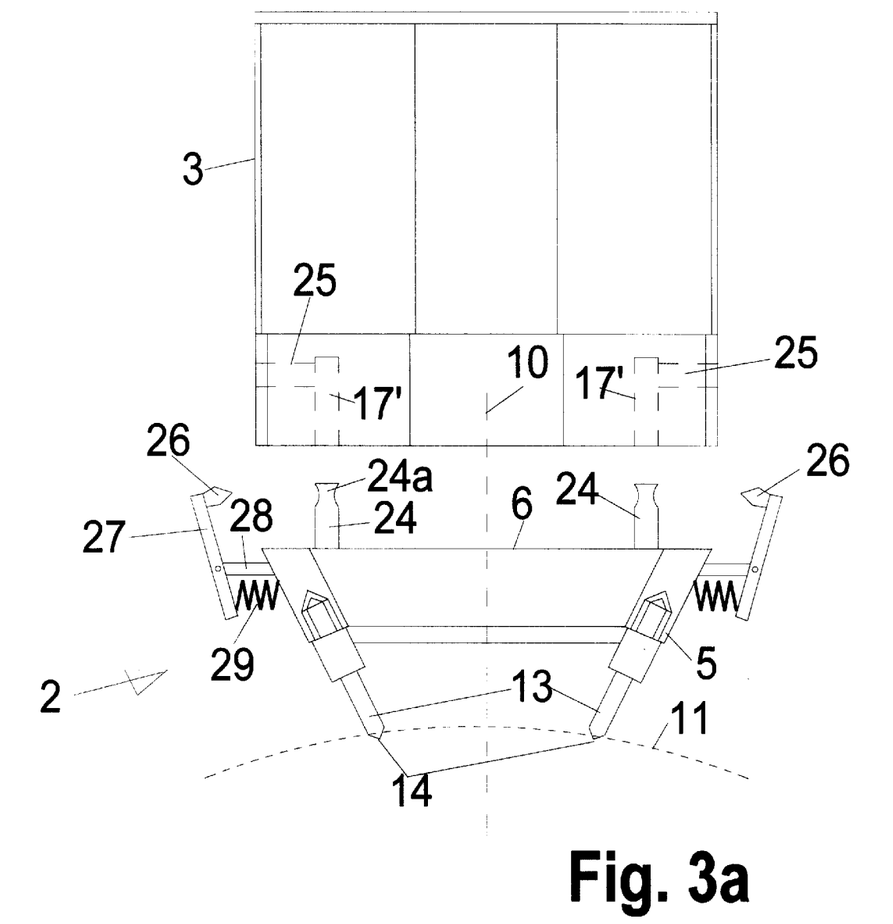
FIGS. 3a and 3b show options for connecting the measuring head to the adaptor ring.

Reference will now be made to FIG. 3a showing a structure in which the adaptor ring 2 which has three legs or feet 13 each having a respective point or tip 14 fitting on the surface of the object 11, wherein the adaptor ring 2 is connected to the measuring head by means of a retaining or detent connecting assembly which will now be described with reference to FIG. 3a.

In this case, fitted into bores 17 in the adaptor ring 2 are fitting pins 24 which project into corresponding fitting bores 17' in the measuring head 3 when the measuring head 3 is fitted on to the rear flat face 6 of the adaptor ring 2. In that case, in their rear region which projects into the measuring head 3 the pins 24 have an annular constriction or necking 24a and in that region a transverse bore 25 which extends radially inwardly is provided in the measuring head 3 in such a way as to intersect with respective ones of the bores 17', as can be clearly seen from FIG. 3a.

When the measuring head 3 is fitted to the adaptor ring 2, a projection 26 can be introduced radially from the exterior into a respective transverse bore 25 and, engaging with as close a fit as possible into the constriction 24a, can provide a locking action, involving positively locking relationship, between the measuring head 3 and the pins 24. If the pins 24 are in turn fixed in the adaptor ring 2 in positively locking relationship, for example by screw means, that arrangement provides that the adaptor ring 2 and the measuring head 3 are fixed together in a defined position in positively locked relationship.

For that purpose, the projections 26 which are associated with each of the fitting pins 24 are each arranged at the front end of a respective pivotal lever 27 which extends approximately parallel to the longitudinal direction 10, and face radially inwardly. The pivotal levers 27 are each in turn secured pivotably at a spacing from the projection 26 to a base lever 28 which is fixed to the adaptor ring 2 and which projects radially outwardly, for example by being screwed into the transverse screwthreaded bores 21.

The pivotal levers 27 and thus the projections 26 thereof are each biased into the locking position by way of respective springs 29.

Figure 3B:
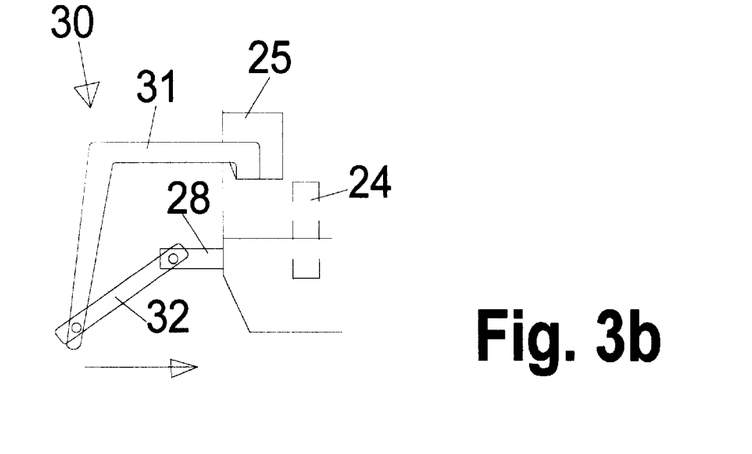

Reference will now be made to FIG. 3b illustrating an alternative form of an arrangement for producing a positively locking connection between the measuring head holder according to the invention and the measuring head 3, insofar as positioning between the adaptor ring 2 and the measuring head 3 is also implemented again by way of fitting pins 24, but the fixing action is afforded by way of over-dead center levers, referred to as snap-action lever mechanisms, as indicated at 30.

It will be seen that the mechanism 30 comprises a holding lever 31 which is of a cranked or elbow-like configuration and which engages with a free front end thereof into a transverse bore 25 or a similar radially disposed opening in the periphery of the measuring head 3. Spaced therefrom, the lever 31 is mounted pivotably by way of an intermediate lever 32 to a base lever 28 which extends radially outwardly from the adaptor ring 2.

In operation of this arrangement, after the free end of the respective holding lever 31 has been fitted into the transverse bore 25 which is preferably of an undercut configuration can be seen from FIG. 3b, biased fixing of the measuring head 3 to the adaptor ring 2 is achieved after the holding lever 31 is moved downwardly in FIG. 3b towards the position shown therein, the fixing action occurring once the holding lever 31 has moved beyond a dead-center position so as to provide an over-center latching action.

Figure 4:
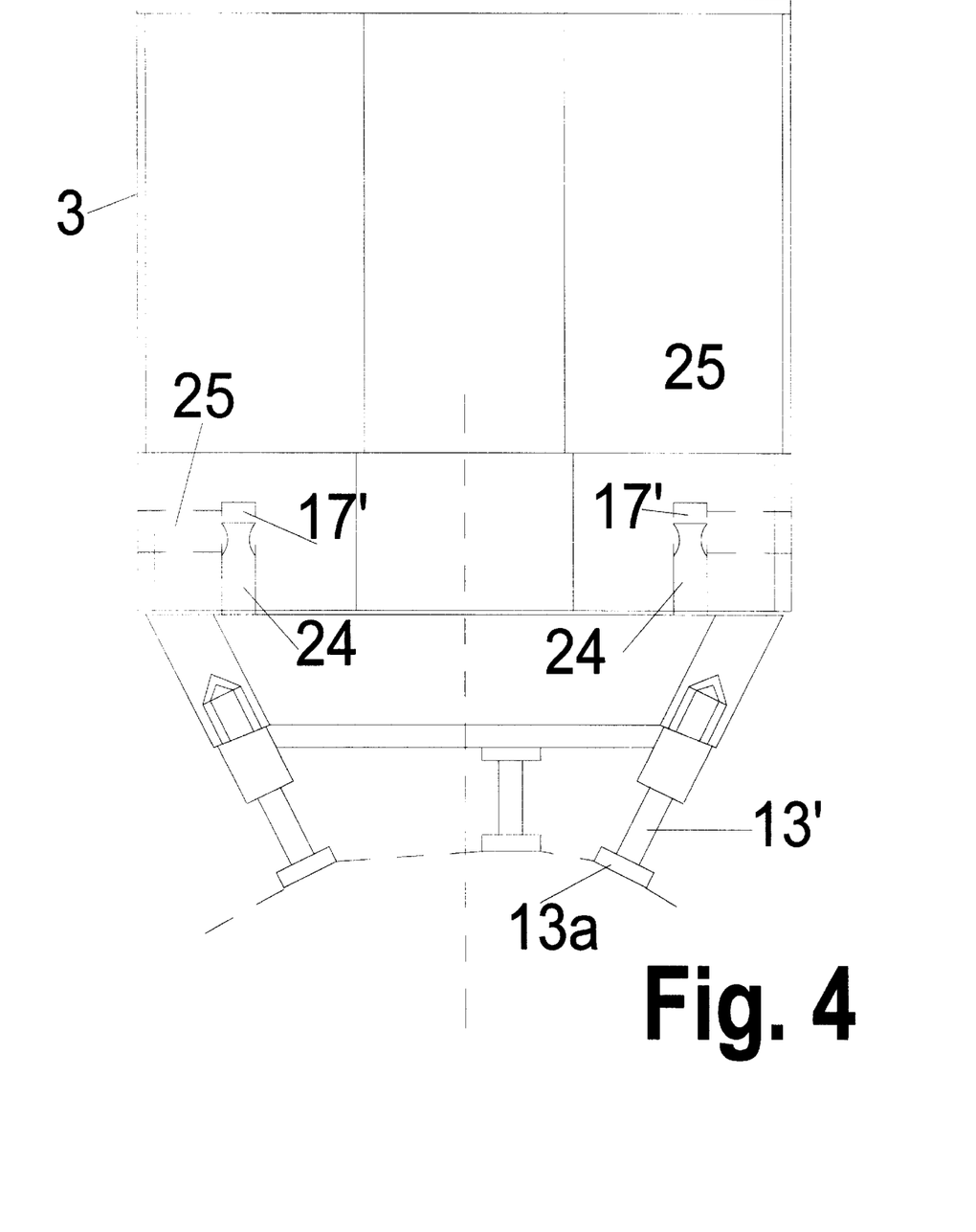
FIG. 4 shows an arrangement having feet or legs in the form of magnetic feet.

Looking now at FIG. 4, shown therein is a measuring head holder according to the invention having feet or legs which are indicated in the form of magnetic legs identified by reference numeral 13'. That is to say, at their respective free end with which they each bear against the surface of the object 11, the legs 13' each have a magnet 13a, in particular a permanent magnet with a high level of magnetic holding force.

With this arrangement, just as in the case of the arrangement shown in FIG. 3a in which all legs 13 are fitted with points or tips 14, the spacing of the mounting points of the legs 13' on the object 11 can be altered, by a loading of the object 11. As the connections between the legs 13' and the object 11 are each fixed, that effect must be compensated by suitable inherent elasticity in the legs 13' so that it is important that the legs 13' used each involve the same flexural stiffness.

Attention will now be directed generally to FIGS. 5 through 8 which, irrespective of the nature of the respective support feet or legs used, show possible ways of securing the measuring head holder generally indicated at reference numeral 1 to the surface of an object 11.

Figure 5:
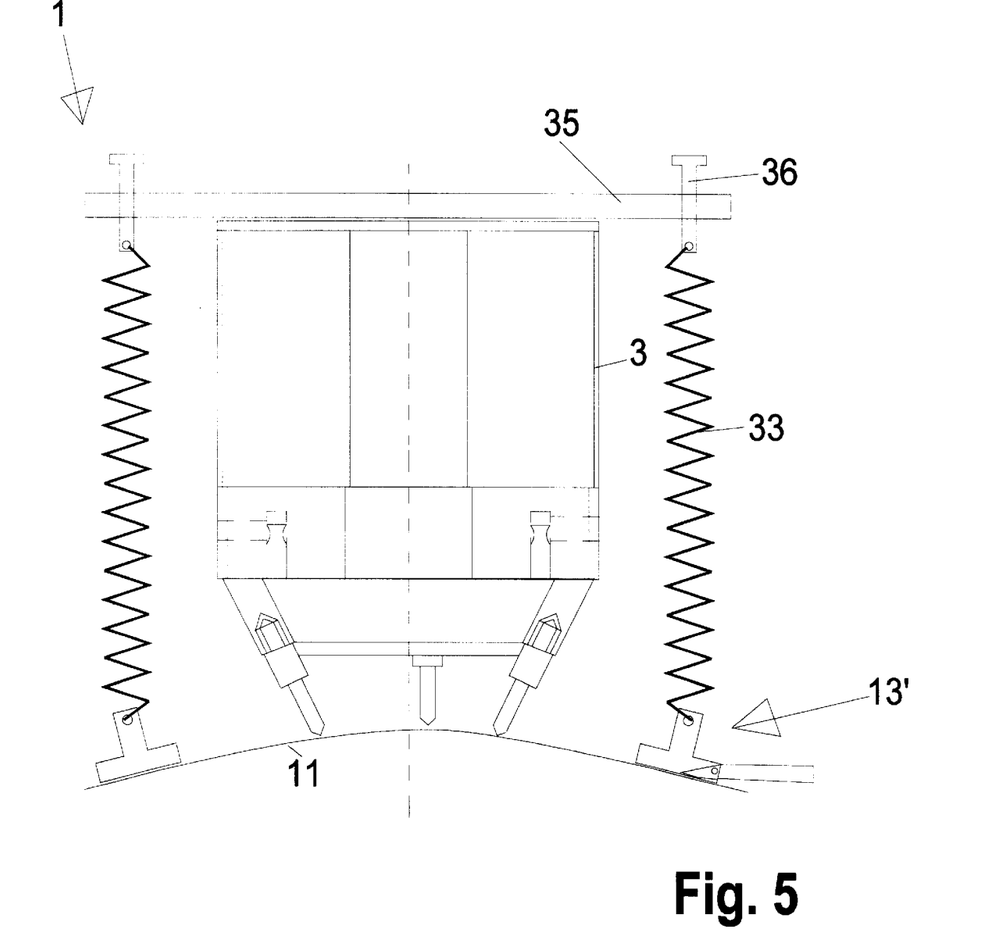
FIG. 5 shows fixing of the measuring head holder to an object by means of individual magnetic holders.
Figure 8:
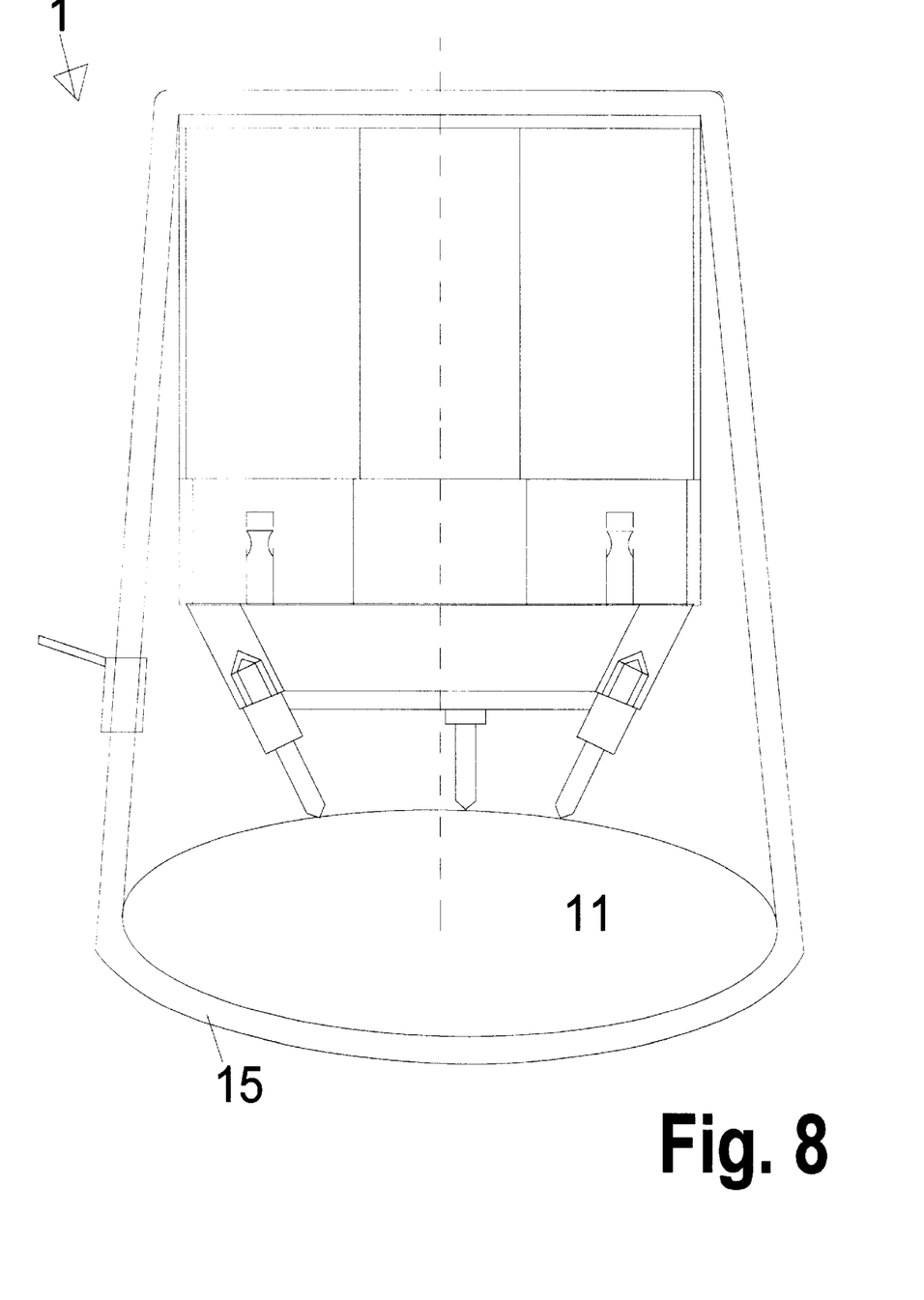
FIG. 8 shows a further fixing configuration by means of a clamping belt.

It will be noted at this point that FIGS. 5 and 8 both show arrangements in which securing of the measuring head holder 1 to the object 11 also provides for fixing the measuring head 3, which on the one hand represents a very secure and reliable fixing mode, while on the other hand permitting the measuring head 3 to be quickly and easily removed from the measuring head holder 1 which is left on the object 11.

Referring therefore now to FIG. 5, shown therein is a structure in which securing struts or arms 35 which are secured to the measuring head 3 extend radially outwardly from the rear end of the measuring head 3. Arranged at the free ends of the securing arms 35 are elastic tension elements illustrated in the form of tension springs 33, at the other end of which is fixed a respective magnetic foot or leg 13' which clings magnetically to the surface of the object 11.

In this condition, the tension spring which is provided at each of the securing struts or arms 35 is already under a tensile stress and thus presses the measuring head holder 1 towards the surface of the object 11.

In order to regulate the biasing force, the spring 33 may be arranged on the securing strut or arm 35 not directly but by means of a screwthreaded pin or bolt 36 which extends in the longitudinal direction of the spring. In that way, the biasing force of the tension spring 33 can be adjusted by screwing adjustment of the screwthreaded pin or bolt 36.

Depending on the holding force of the magnets used, in which respect in particular rare earth magnets may be employed, it may be necessary to provide on the magnets lift-off devices, for example pivotal levers, for removing the magnets from the object 11. The lift-off devices may be in particular fixedly disposed on the magnets.

Figure 6:
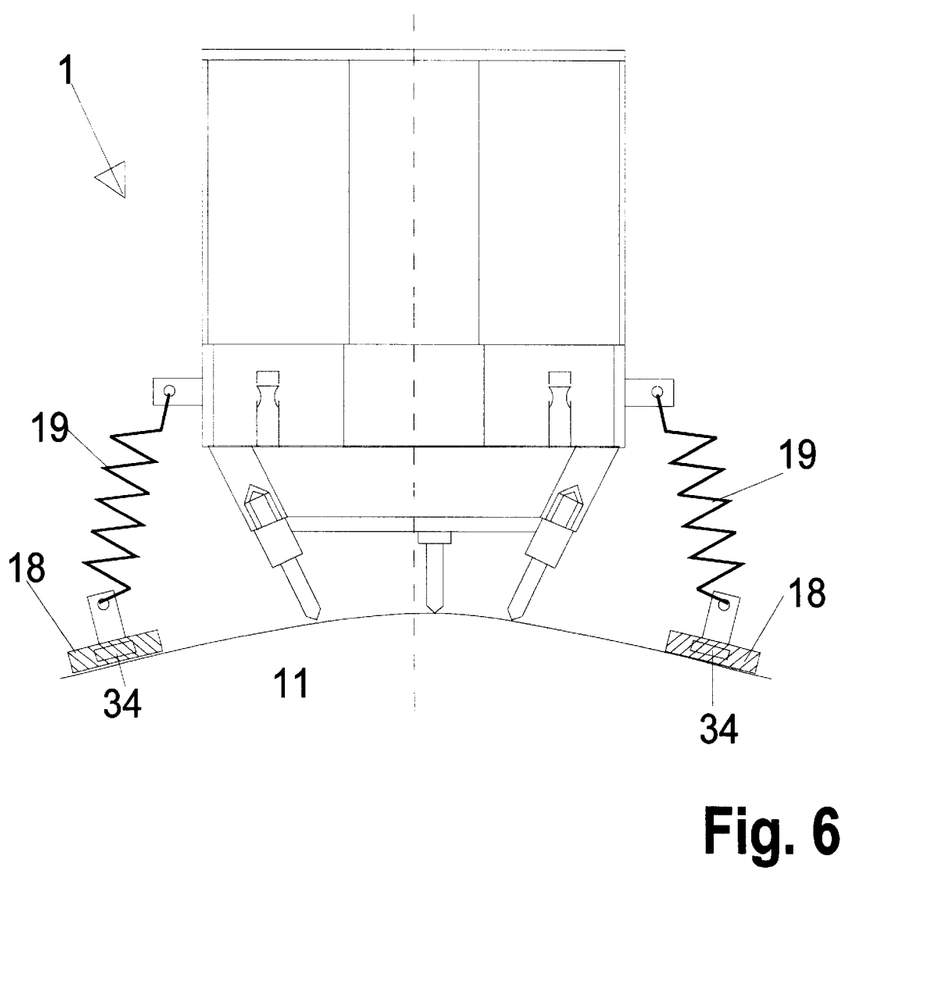
FIG. 6 shows fixing of the measuring head holder to an object by means of a magnetic ring.
Figure 7:
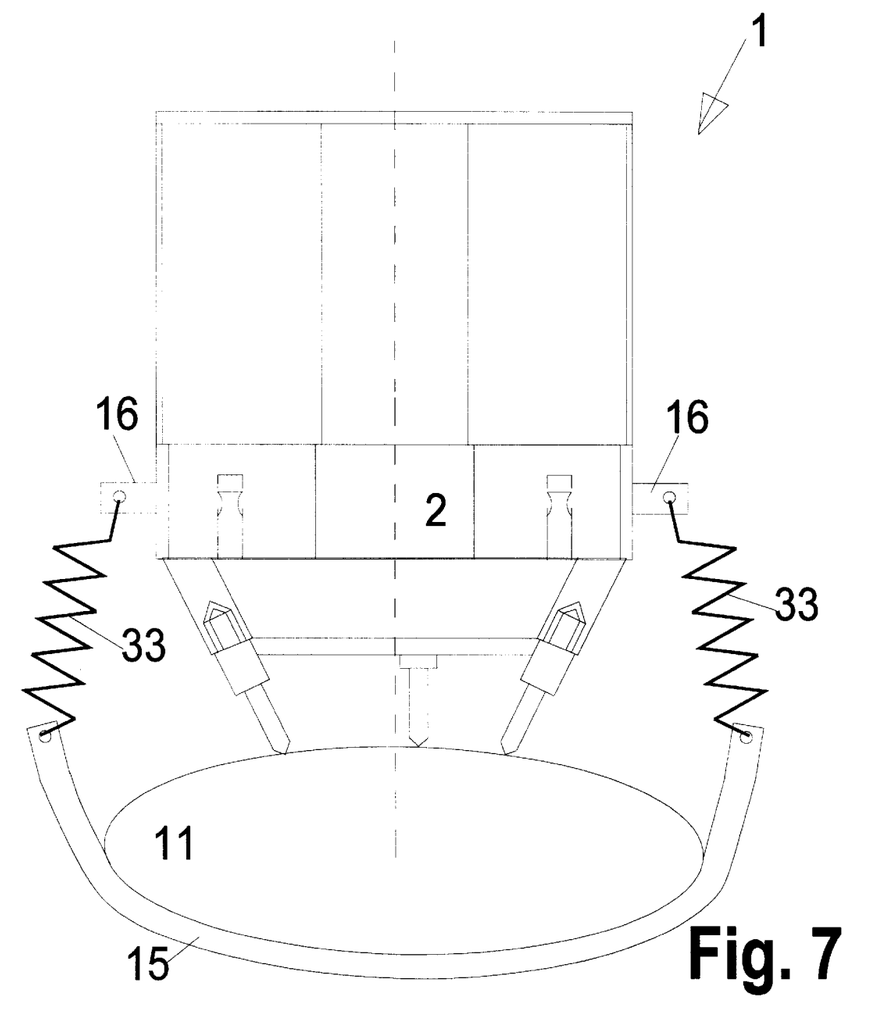
FIG. 7 shows fixing to an object by means of a clamping belt embracing same.

FIG. 6 shows a somewhat similar structure in which arranged on clamping pins or bolts which are shown in FIG. 6 but not referenced but which are referenced by reference numeral 16 in FIG. 7 are tension belts or bands which are directed radially outwardly and downwardly towards the object 11 and which are fixedly connected at their respective free ends to a contact ring 18. The contact ring 18 clings to the surface of the object 11 either by means of magnets 34 which are fitted thereinto or for example by means of adhesive.

The biasing force with which the feet 13 of the measuring head holder are pressed into contact against the surface of the object 11 is applied by the inherent elasticity in the tensioned bands or belts 19 which are shown diagrammatically in spring form to represent that elasticity.

Referring to FIG. 7, shown therein is a structure in which the adaptor ring 2 has transverse screwthreaded bores 21 into which are screwed clamping pins or bolts 16 which project laterally from the adaptor ring 2 at two opposite sides. A clamping belt or strap 15 can be connected by its ends to each of the clamping pins or bolts 16. The clamping belt or strap 15 extends over the rear of the object 11, at the side thereof remote from the measuring head holder 1, and is either lengthwise elastic in itself or it is resilient by one or more tension springs 33 being connected between the ends of the clamping belt or strap 15 and the respective pins or bolts 16, thereby to apply a biasing force.

It will be appreciated that a similar arrangement could also be provided in a duplicate configuration, being turned through 90° relative to that shown in FIG. 7, so that the two clamping belts or straps 15 cross each other.

Referring to FIG. 8, in a similar structure to that shown in FIG. 7, a clamping belt or strap 15 is looped around the rear of the object 11. The belt or strap 15 however does not terminate at the adaptor ring 2 but is preferably laid in the form of a closed loop around the rear of the measuring head 3, thereby at the same time to secure the measuring head 3 in position in the measuring head holder 1.

It will be appreciated that the above-described embodiments of the measuring head holder according to the invention have been set forth solely by way of example and illustration of the principles thereof and that various other modifications and alterations may be made therein without thereby departing from the spirit and scope of the invention.

What is claimed is:

1. A measuring head holder for securing a measuring head to an object to be measured, comprising
   a receiving portion for definedly securing a measuring head thereto, and
   at least one securing element for fixing said receiving portion to said object to be measured,
   wherein the receiving portion is such that at least first, second and third locations ensure a defined spacing of the measuring head holder relative to said object without a fixed point of the receiving portion on the object even in the event of deformation of the object and deformation between the locations.

2. A holder as set forth in claim 1
   wherein the receiving portion is adapted to cause a point of the measuring head holder to remain in a constant relative position to a point on said object even in the event of deformation of the object.

3. A holder as set forth in claim 1 including
a plurality of contact points between the measuring head holder and said object, wherein the fixed point is one of said contact points.

4. A holder as set forth in claim 1
wherein said fixed point is a point in a measuring area of a measuring head, in particular a geometrical center point of the receiving portion.

5. A measuring head holder for securing a measuring head to an object to be measured, comprising
a receiving portion for definedly securing a measuring head thereto, and
at least one securing element for fixing said receiving portion to said object to be measured,
wherein said at least one securing element comprises a plurality of feet each having a first end secured to said receiving portion and a second end adapted to bear against said object, and further comprising
spring means for holding said feet against the object in a biased condition.

6. A holder as set forth in claim 5
wherein said at least one securing element comprises a plurality of feet each having a first end secured to said receiving portion and a second end adapted to bear against said object.

7. A holder as set forth in claim 5
wherein a biasing means include at least one of magnetic means, vacuum means, increased air pressure means and hydraulic means.

8. A holder as set forth in claim 5 including
a magnet means at the second end of each said foot to produce a magnetic holding force.

9. A holder as set forth in claim 5
wherein length of the feet and the inclined positioning of screwthreaded bores for the feet are so dimensioned that front contact ends of the feet towards the object are within a free cross-section of a through opening.

10. A measuring head holder for securing a measuring head to an object to be measured, comprising
a receiving portion for definedly securing a measuring head thereto,
at least one securing element for fixing said receiving portion to said object to be measured, and
a clamping strap for holding the measuring head holder to said object by embracing said object and optionally also a measuring head,
wherein said clamping strap includes spring means in the length thereof.

11. A holder as set forth in claim 10 and further including
pin means secured to at least one of said receiving portion and a measuring head, wherein the clamping strap is secured to the pin means.

12. A holder as set forth in claim 10
wherein said pin means is secured by screwing.

13. A measuring head holder for securing a measuring head to an object to be measured, comprising
a receiving portion for definedly securing a measuring head thereto, and
at least one securing element for fixing said receiving portion to said object to be measured,
wherein said receiving portion has a rear face at a side thereof which in operation is remote from said object,
wherein said rear face has fitting means for definedly reproducibly fitting a measuring head thereto, and
wherein said fitting means are fitting bores.

14. A holder as set forth in claim 13
wherein said fitting means are so arranged that a measuring head can be fitted on said receiving portion only in a single position.

15. A holder as set forth in claim 13
wherein said adaptor ring has a flat annular rear face for fitting a measuring head thereon, said rear face having fitting means for fitting a measuring head thereon.

16. A measuring head holder for securing a measuring head to an object to be measured, comprising
a receiving portion for definedly securing a measuring head thereto, and
at least one securing element for fixing said receiving portion to said object to be measured,
wherein said receiving portion is an adaptor ring having a through opening which is in particular larger than a measuring area of a measuring head, and
wherein said adaptor ring has an annular front face which is inclined in a concave conical inward configuration and in which are provided bores optionally perpendicular to an inclined end face, for insertion of feet.

17. A holder as set forth in claim 16
wherein said feet are uniformly peripherally distributed.

18. A measuring head holder for securing a measuring head to an object to be measured, comprising
a receiving portion for definedly securing a measuring head thereto, and
at least one securing element for fixing said receiving portion to said object to be measured,
wherein said receiving portion is an adaptor ring having a through opening which is in particular larger than a measuring area of a measuring head, and
wherein said adaptor ring has along its periphery which slope inclinedly outwardly from a front face of the adaptor ring and which are interrupted by four perpendicular flanks which are spaced from each other at 90° angles.

19. A holder as set forth in claim 18
wherein said flanks are produced by milling.

20. A measuring head holder as set forth in claim 18
wherein provided in a region of the perpendicular flanks are transverse screwthreaded bores which extend transversely with respect to a longitudinal direction, in which the central through opening extends through the adaptor ring, said bores being open at least to outside surfaces of said perpendicular flanks.

21. A holder as set forth in claim 18
wherein arranged in a region of said inclined flanks are securing openings extending in particular in a longitudinal direction, in a shoulder in the adaptor ring, for screwing the adaptor ring to a measuring head.

* * * * *